O. C. F. RIEPLING.
VALVE.
APPLICATION FILED OCT. 27, 1919.

1,409,470.

Patented Mar. 14, 1922.

INVENTOR
Otto C.F. Riepling
BY Strong & Townsend
ATTORNEYS

UNITED STATES PATENT OFFICE.

OTTO C. F. RIEPLING, OF PINOLE, CALIFORNIA.

VALVE.

1,409,470.           Specification of Letters Patent.   Patented Mar. 14, 1922.

Application filed October 27, 1919. Serial No. 333,674.

*To all whom it may concern:*

Be it known that I, OTTO C. F. RIEPLING, a citizen of the United States, residing at Pinole, in the county of Contra Costa and State of California, have invented new and useful Improvements in Valves, of which the following is a specification.

This invention relates to a valve construction, and particularly pertains to a valve for handling high explosives and acids.

It is the principle object of the present invention to provide a valve structure, which is especially adapted for handling chemicals which cause the corrosion of metals and also which must be carefully handled so that they will not explode, due to jar or vibration of the valve.

The present invention contemplates the use of a rotatable valve member mounted within a housing, and which member is controlled by means for successively elevating and rotating the valve by a continuous rotary movement of the valve handle.

The invention is illustrated by way of example in the accompanying drawings, in which—

Figure 1:
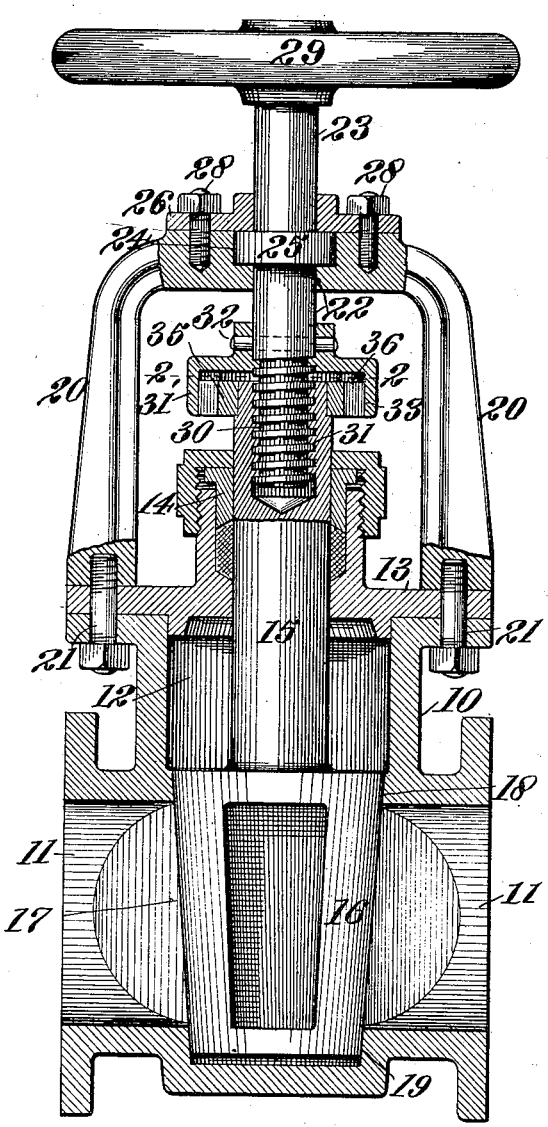
Fig. 1 is a view in central, vertical section through the valve, showing the construction and relation of the parts.

In the drawings, 10 indicates a valve housing, which is preferably formed of gray iron or other metal especially capable of resisting the corrosive action of acid and other chemicals. This valve housing is formed with a central opening 11, through which the material controlled is intended to flow. The opposite ends of this opening are surrounded by bolting flanges by which it may be secured to proper pipe fittings. Extending at right angles to the opening 11, is a valve chamber 12. This chamber is substantially cylindrical and is closed at its upper end by a disk 13. The disk 13 carries a packing gland 14, through which a valve stem 15 extends. The valve stem is adapted to slide through the packing gland 14 or rotate therein, and to thus operate a valve member 16 which is preferably formed integral with the lower end of the stem. The valve member and its stem are formed of cast iron or other suitable non-corrosive material.

The valve member 16 is frusto-conical in formation and has central valve openings 17 therethrough. The sides of the opening 11 slightly converge and thus provide a suitable side wall for the tapered outer face of the valve 16 and thereby normally close the openings 17 when the longitudinal center of this opening is transversely of the longitudinal axis of the opening 11 through the housing. The upper end of the valve member 16 is adapted to be brought to seat upon a tapered face 18, which occurs between the run 11 and the valve chamber 12. It will be understood that the diameter of the valve chamber is slightly in excess of that of the upper or base end of the valve member 16, and that the valve will move upwardly into this chamber when actuated. The lower end of the valve member 16 rests within a tapered seat 19 formed in the bottom of the run 11.

Secured upon the top of the disk 13 is a standard 20. This standard is bolted to the disk and also the valve housing, by means of cap screws 21. Formed centrally of the standard and in longitudinal alignment with the central axis of the valve stem 14 is a bore 22, through which an operating stem 23 extends. This bore is counterbored, as shown at 24, to receive a fixed collar 25 carried upon the operating stem 23. A retaining plate 26 is fastened by cap screws 28 upon the top of the standard 20 and over the collar 25. This plate will hold the operating stem 23 against longitudinal movement while permitting it to rotate within the standard for a purpose hereinafter set forth.

Figure 2:
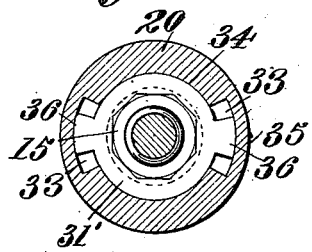
Fig. 2 is a view in transverse section through the valve stem, as seen on the line 2—2 of Fig. 1.

The upper end of the stem 23 is provided with a hand wheel 29, by which the stem may be rotated. The lower end of the operating stem 23 is formed with screw threads 30. These threads extend downwardly and are in engagement with a central threaded bore 31 of the valve stem 14. It will be evident, therefore, that rotation of the operating stem 23 in relation to the valve stem 14 will cause the valve 16 and its stem to be vertically reciprocated. This reciprocation is, however, limited and the rotary action of the actuating stem 23 is afterwards imparted to the valve stem by means of a cap 31, which is secured to the actuating stem 23 by set screws 32. This cap is formed as shown in Fig. 2 with diametrically opposite segmental recesses 33. These recesses emanate from a central, circular bore 34. The bore 34 is intended to accommodate an operating disk 35. This disk is also shown in Fig. 2, where it will be seen to have diametrically opposite radial lugs 36, which extend into the recesses 33 and 34 of the cap. The end faces of the recesses 33 are radial with the longitudinal axis of the stem 14 and the opposite ends of the lugs 36 are also radial with this axis although the length of the lugs, measured circumferentially, is considerably less than the width of the recesses measured circumferentially. This construction will permit a certain lost motion between the valve stem 14 and the actuating stem 23 as the operating disk 35 is fixed upon the upper end of the valve stem 14.

In operation of the present invention, it will be assumed that the frusto-conical valve member 16 is firmly seated within the tapered counter-bore 19 and through the valve seat 18, at the same time with the central valve passageway 17 extending transversely of the run 11. In this condition, the run will, of course, be closed. When it is intended to operate the valve, the wheel 29 is rotated. This will produce an initial operation to rotate the valve stem 23 and its screw 30 without rotating the valve stem 15. This relative motion, as before explained, is permitted by the differences in length between the lugs 36 of the disk 35 and the recesses 33 of the cap 31. During this partial rotation of the stem 23, the screw 30 will act to draw the stem 15 and the valve 16 upwardly. This motion need only be slight as it is intended merely to break the seal between the outer surface of the valve member 16 and the tapered faces of the counter-bore 19 and the valve seat 18. By the time the valve has been elevated sufficiently to produce this result, the lugs 36 will have encountered the end of the recess 33 and then when the hand wheel 29 is further rotated, the operating stem 23 and the valve stem 15 will move in unison to rotate the valve member 16 and to place the central opening of the valve in parallel with the run 11. A free flow of the liquid will then be permitted to the valve housing. This operation will first cause the valve to be rotated until the opening 17 is closed and then by a slight reverse rotation will cause the valve to be lowered onto its seats.

It will be evident that by the use of such a valve as here disclosed, high explosives may be easily handled as there is no occasion for violent operation of the valve member or any hammering or jar to loosen the valve from its seat, which would be liable to explode the chemical controlled by the valve. It is further evident, that due to the present construction, a one-piece valve member of non-corrosive material may be used and enclosed within a housing of a similar material so that there is very little possibility of erosion of the valve stem 15 with the incident disagreeable result.

While I have shown the preferred form of my invention, it will be understood that various changes may be made in the combination, construction and arrangement of parts, without departing from the spirit of the invention as claimed.

Having thus described my invention, what I claim and desire to secure by Letters Patent is—

1. A valve comprising a body portion having a passageway formed therethrough, a valve chamber and seat formed in the body at right angles to the passageway and intersecting the same, the said valve seat being tapered, a cover member adapted to form a closure for one end of the chamber, a standard member secured to and extending from said cover, a tapered valve member in the chamber and adapted when seated to extend across the passageway, the said valve having a stem extending through and journalled in the cover, an operating member mounted in the standard in a manner permitting turning movement but preventing endwise movement, the said operating member being threaded into the valve stem, a recessed cap secured to the operating member, a disk secured to the valve stem and having lugs thereon engageable with the recesses in the cap for co-operating therewith to permit the operating member to slightly raise the valve and then rotate the same.

2. A valve structure comprising a housing having a horizontal central run therethrough, and a tubular vertical portion emanating from the upper side of said run, a tapered valve seat through which communication between the central run and the vertical portion is established, a tapered valve seat in the bottom wall of the housing and in longitudinal alignment with the upper valve seat, a tapered valve extending vertically across the run of the valve housing and adapted to simultaneously seat in the tapered valve seats at the top and bottom of said run, a cover closing the mouth of the vertically tubular portion of the valve housing, a valve stem formed integral with the top of the valve and extending through said cover, said stem and valve being formed of acid resisting metal, a stuffing box carried by the cover, and through which the valve stem projects, a bracket bearing standard extending upward from said cover, an operating shaft rotatably mounted therethrough and held against the longitudinal movement, said shaft being threaded into the upper end of the valve stem and cooperating means upon the outer end of the valve stem, and upon the operating shaft for causing the valve stem to be rotated after a predetermined rotation of the operating shaft accompanied by the reciprocating action of the valve.

In testimony whereof I have hereunto set my hand in the presence of two subscribing witnesses.

OTTO C. F. RIEPLING.

Witnesses:
E. K. DUNLAP,
A. E. DUNLAP.